Patented Dec. 5, 1939

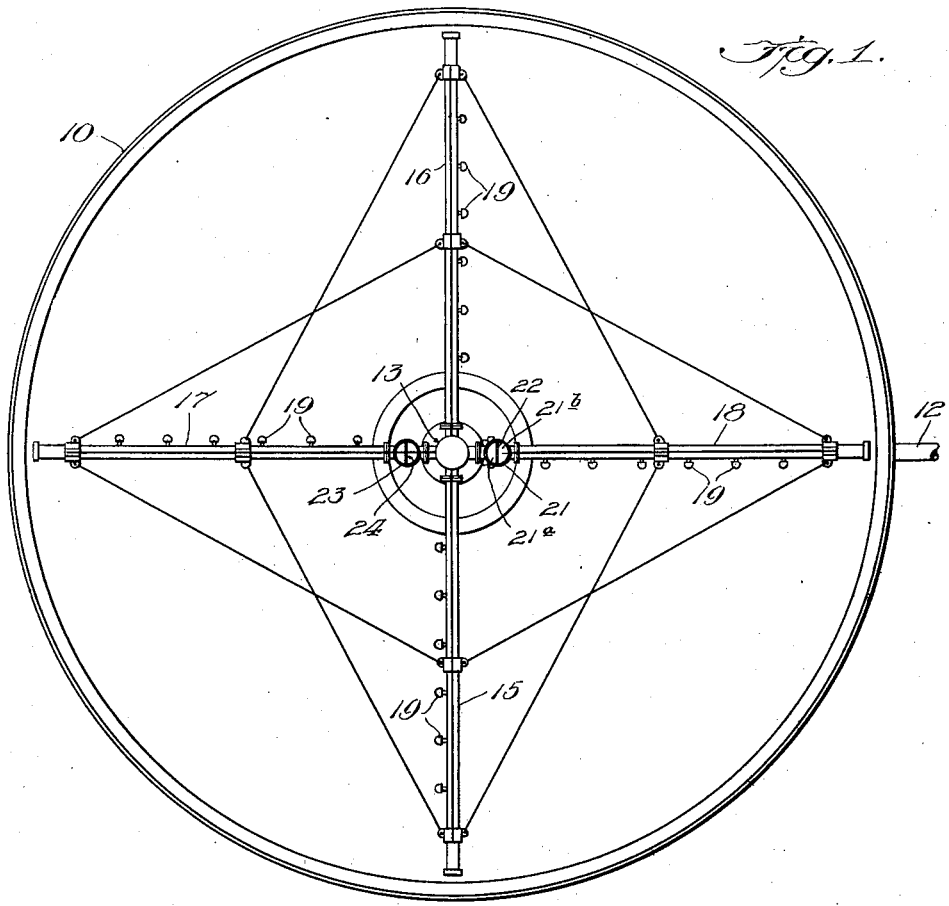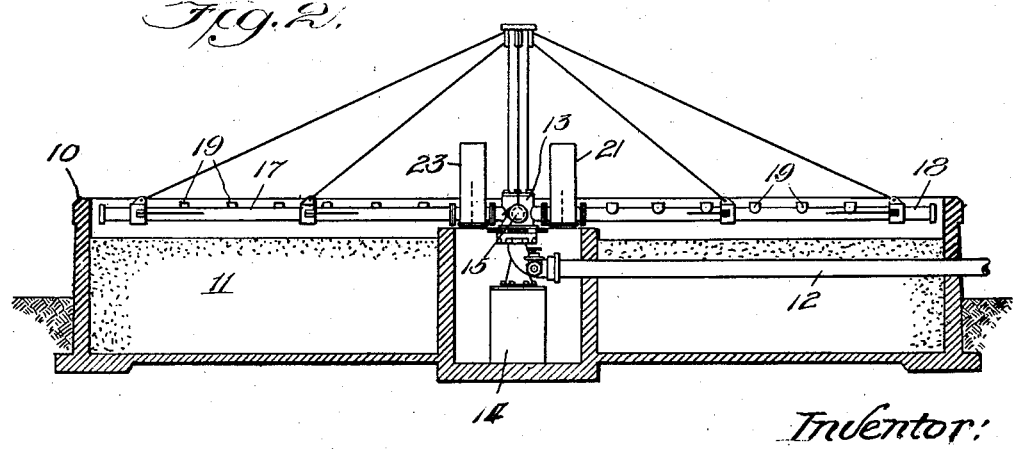

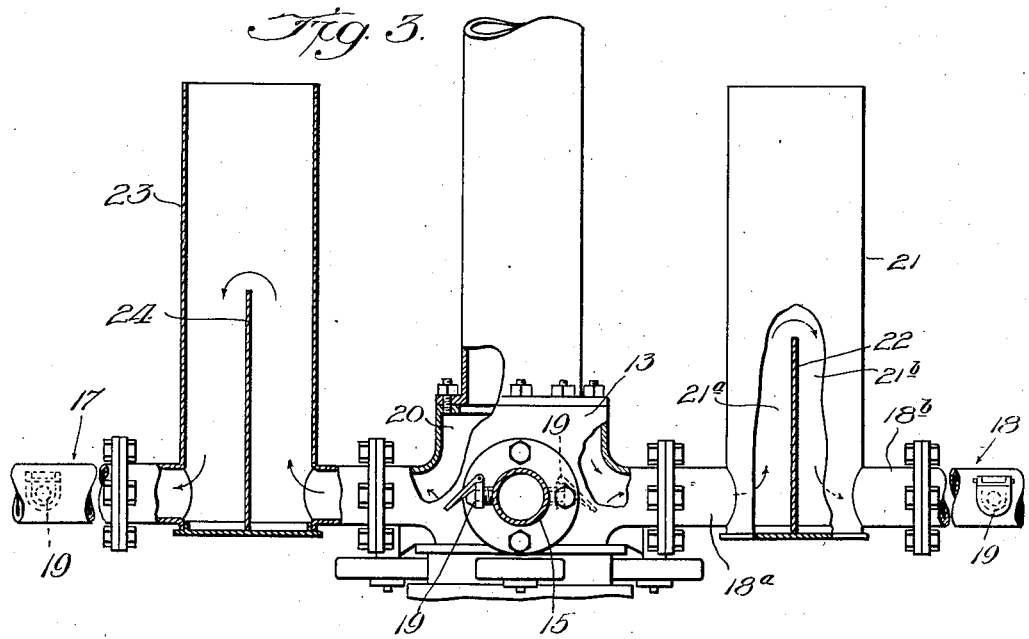
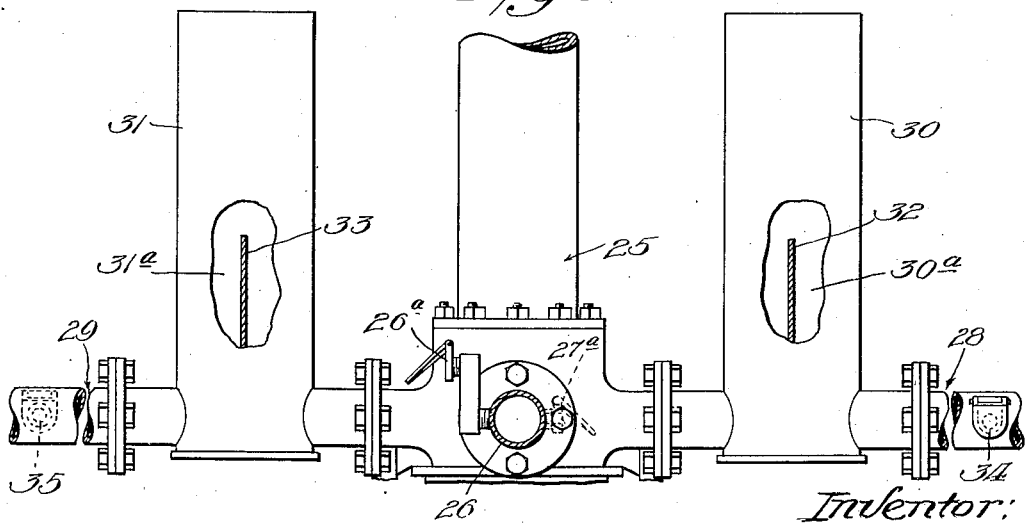

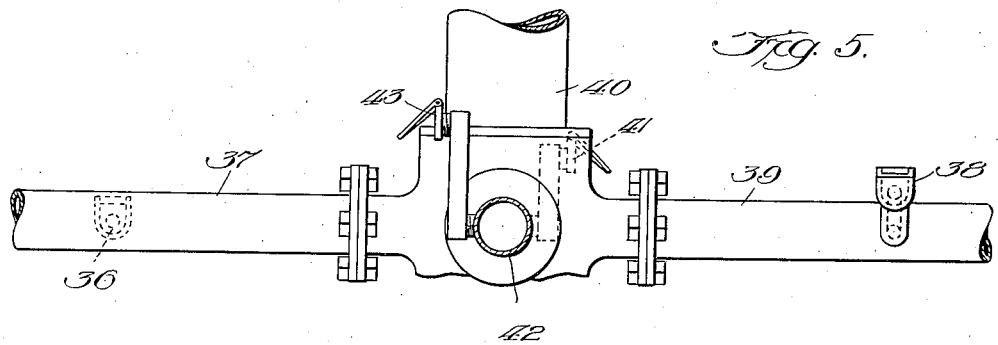
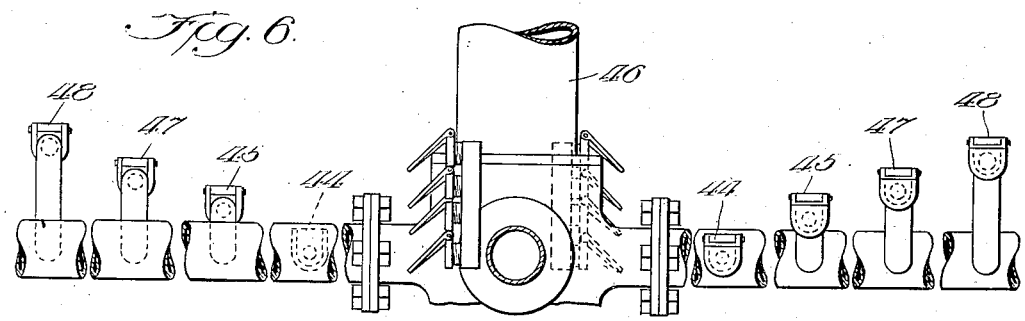
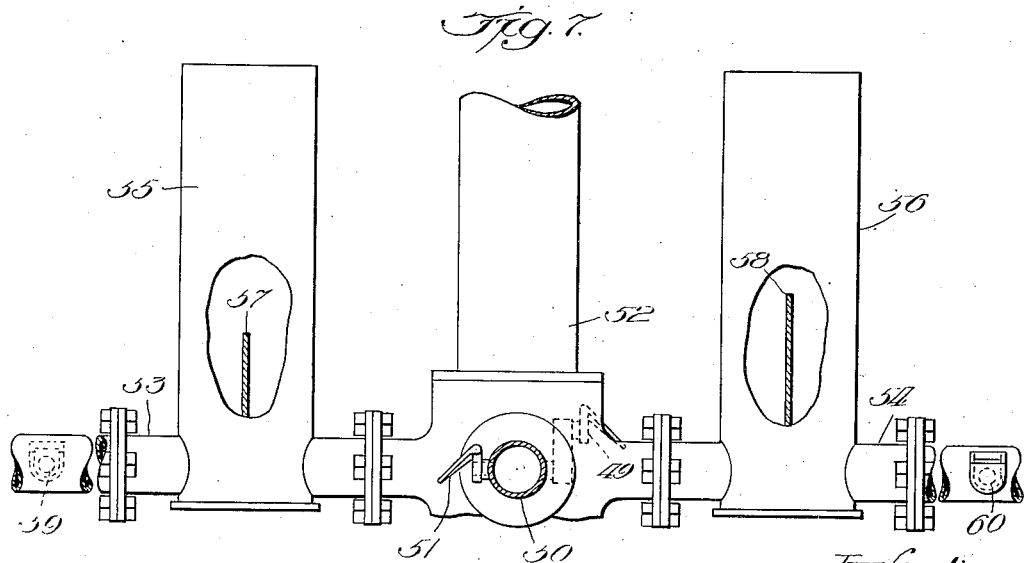

2,181,932

UNITED STATES PATENT OFFICE 2,181,932

ROTARY DISTRIBUTOR FOR SEWAGE TREATMENT SYSTEMS

Hubert Beddoes, Chicago, Ill., assignor to Pacific Flush Tank Company, Chicago, Ill., a corporation of Illinois Application December 19, 1936, Serial No. 116,778

12 Claims. (Cl. 299—69)

My invention relates to rotary distributors for sewage treatment systems and has to do generally with rotary distributors of that character wherein power for rotating the distributor is derived from the reaction of jets of material discharging from distributing members.

One of the objects of my invention is to provide an improved distributor of the foregoing character which is not only simple in construction but is highly efficient in operation.

Another object is to provide means whereby the range of continuous operation of the distributor is materially extended without increasing the size thereof.

A further object is to increase the capacity and range of operation of the distributor without the addition of distributing members and without increasing the normal operating heads.

Still another object is to provide a structure of the foregoing character including distributing arms having reactionary distributing jets associated therewith, and with which there are associated means whereby the distributor is caused to operate under minimum head conditions while, at the same time, the distributing capacity of the arms and jets may be increased to increase the capacity of the distributor as a whole and its range of continuous operation without increase in maximum operating head. In this manner, even though the capacity of the distributing members and jets is greatly increased, this increase in capacity does not affect the desired rotation of the distributor under the minimum head operating condition.

A more specific object is to provide a rotary distributor having a plurality of distributing arms, each with reactionary jets thereon, at least one of which arms is so arranged with jets that the material is discharged therefrom under minimum head conditions in such a way as to set up and continue the reactionary actuated movement of the distributor, and the other arms are so arranged that the jets thereof are adapted to discharge material therefrom in succession dependent upon the increase in operating head, the jets of the successively cut in arms being, preferably, increased in capacity so that an increased discharge capacity is assured.

Additional objects are to provide means controlled by the level of the liquid, or the effective head, to cause each of a plurality of rotary distributing arms to discharge material in successive order; to provide means for insuring that the several distributing arms will be continuously filled with material so that they are balanced in weight, even though they are cut in successively at different intervals under different head conditions; and to provide capacity increasing means that may be applied to distributor devices already constructed and in use without material change therein.

Other objects and advantages will become obvious as this description progresses and by reference to the drawings, wherein—

Figure 1 is a top plan view of one form of rotary distributor embodying my invention;

Fig. 2 is a vertical section, partially in elevation, of the structure shown in Fig. 1;

Fig. 3 is an enlarged vertical sectional view through the distributing structure shown in Figs. 1 and 2;

Fig. 4 is a view similar to Fig. 3 except showing another form of my invention; and Figs. 5, 6 and 7 are views similar to Fig. 3 and illustrating additional forms of distributing structure embodying my invention.

Referring particularly to Figs. 1 and 2, my invention is well adapted for use in connection with a filter structure including a circular enclosure 10 in which is located a trickle filter bed 11 formed of crushed rock or stones in a manner which will be well understood. Sewage is fed from a primary treatment source (not shown) through a conduit 12 to the rotary distributing means located above the filter bed, and which will now be described.

The distributor includes a central, hollow drum 13 mounted in any desired manner for rotation upon a central support structure 14. The sewage material is fed into this drum through the conduit 12 and is fed from such drum into a plurality (preferably four or more) of hollow radiating arms 15, 16, 17 and 18. The end of each of these arms extends into close proximity to the enclosure 10 and they are located slightly above the top of the filter bed 11. Each of the arms 15—18 is provided with a plurality of openings to which are connected reactionary jets 19, each of which is, preferably, of the form disclosed in my Letters Patent No. 2,046,865, granted July 7, 1936, and these jets need not, therefore, be described in detail herein.

Taking a structure of the foregoing character, and of some particular size, it may be desired to increase the discharge capacity of the structure without enlarging the same so that the range of continuous operation is materially extended. This presents several difficult problems. If it were attempted to increase the discharging capacity of the distributor arms merely by enlargement of the jets or merely by increasing the number of jets, then the distributor would not function properly under minimum head conditions to effect, through the reaction of the jets, the desired rotation of the device under minimum head operation. In other words, through arrangements heretofore employed, the use of arms of proper distributing capacity for minimum head operation places a rather low limit on the increase in distributing capacity. Also, normally, in structures heretofore employed, an attempted increase in capacity in a given size structure would require a proportionate increase in head so that upon material increase in capacity a prohibitive maximum head would be required for maximum flow conditions. That is to say, in prior structures, if the device is properly designed for the minimum head operation at minimum flow, then a prohibitive head would be required in order to get maximum flow for the desired capacity increase.

The problem is to provide an increased capacity structure without material increase in size of the same, wherein the distributing arms will rotate properly under minimum head and flow conditions and at the same time the arms will distribute with maximum capacity under maximum flow conditions at or near the normal maximum head. This invention provides these desirable features. It provides for increased capacity and range of continuous operation without material increase in size of the structure as a whole; increased range of capacity for continuous operation without increased range of head; and it provides for increased capacity without affecting desired reaction conditions at minimum heads and flows.

One form of distributor structure that may be employed to the foregoing end is shown in Figs. 1, 2 and 3. Specifically, all of the arms 15, 16, 17 and 18 are disposed in substantially the same horizontal plane, and they are similarly connected to the chamber 20 of the central rotary drum structure 13. In this form, the jet devices 19 are arranged on the longitudinal center line of the distributing arms so that the liquid sewage material will flow therefrom whenever the sewage material enters such arms to the height of the jets. The arms 15 and 16 are directly connected to the drum chamber 20 so that the sewage material flows directly thereinto from such chamber, and the jets 19 of these arms are of proper size and capacity for producing the desired reactionary effect to cause rotation of all of the arms or the entire distributor structure when the arms 15, 16 become filled with the sewage material and a head, for example, of 4 inches, is established in the drum chamber 20. The capacity of the jets on the arm 16 are preferably the same as the capacity of the jets on the arm 15 but, if desired, the jets on the arm 16, for example, may be of slightly increased capacity without disturbing the minimum flow and head reactionary effect afforded by the jets 19 on the arm 15.

In the normal operation of structures of this character, increase in head results in increase in flow and capacity. Therefore, as the head is increased in the drum chamber 20 the flow of material through the jets 19 on the arms 15 and 16 is increased and the capacity of the distributor as a whole is increased. A normal maximum operating head may, for example, be 36 inches within the drum chamber 20 and at this head maximum flow is accomplished through the distributor arms 15, 16.

Increased capacity of the distributor is normally effected through the distributor arms 17, 18 and their jets 19. Further increase in capacity is accomplished by enlarging the capacity of the jets on the arms 17 and 18 so that under the same operating head conditions they will discharge a greater quantity of material than the jets on the arms 15, 16. Furthermore, the jets on the arm 17 are, preferably, of greater capacity than the jets on the arm 18 for still further increase in capacity, as will be pointed out more fully hereinafter. The increase in capacity, as above stated, in connection with the jets of the several arms may be accomplished by increasing the number of jets and/or the size thereof, and, wherever increase in jet capacity is referred to herein, it is to be understood that it may be accomplished in either or both of these ways or in any other equivalent and well-known manner.

In increasing the distributing capacity of the arms 17 and 18 in the manner described, the desired reactionary effect of the jets of the several arms to cause rotation of the distributor under minimum flow and head conditions would be lost, unless otherwise provided against. In other words, with the capacity of the arms 17 and 18 increased as stated and directly connected to the flow through drum chamber 20 as in the case of arms 15 and 16, the direct discharge connection would be so increased in capacity that under minimum flow and head conditions the material would most likely discharge through the jets of the several arms in a mere trickle fashion without the desired reactionary effect to cause rotation of the distributor.

To provide against this condition, the following arrangement may be employed in accordance with my invention: In distributor arm 18, closely adjacent the rotating drum 13, I provide a vertical cylinder 21 constituting a weir or overflow chamber having a diametrically and vertically-disposed partition or dam 22 therein. In the distributor arm 17 I provide a similar weir or overflow chamber structure 23 having a dam 24 therein. The overflow chamber 21 is so located in the arm 18 that the sewage material, as it flows into the drum chamber 20, also flows therefrom into the arm section 18ª and into the overflow chamber section 21ª, and the dam 22 in such chamber prevents flow of the sewage material into the arm section 18ᵇ and the remainder of the arm until the head or level of the sewage material reaches and exceeds the height of the dam 22. The material then overflows the dam into the chamber section 21ᵇ and, as soon as it rises within the arm 18 to the height of the jets, it will flow therefrom. At first, this flow may be in the form of a mere trickle and, as the head in the chamber section 21ᵇ increases, say, to 8 inches, the material will be discharged from the jets with a reactionary effect aiding in the rotary action of the distributor. Of course, as the head in the drum chamber 20 is increased still further, with consequent increase in the head in the overflow chamber section 21ᵇ, the discharge capacity of the jets on arm 18 is increased, thereby generally increasing the capacity of the distributor as a whole.

The dam 24 in the overflow chamber 23 is of greater height than the dam 22 in the overflow chamber 21. It will, therefore, be seen that the dam 22 of the chamber 21 will overflow before the dam 24 in the other chamber, and the distributor arm 18 will discharge material prior to any discharge from the other arm 17. However, the dam 24 is of such height that after the arm 18 begins to discharge with, at least, some reactionary effect, and the head has been increased in the drum 13 sufficiently for that purpose, the dam 24 in the chamber 23 is overflowed and the material begins to discharge from the jets of the arm 17. Like the arm 18, the material may first discharge from the jets of the arm 17 with a mere trickle and, upon increase in head in the drum chamber 20 and chamber 23, the discharge will increase so as to have a reactionary effect aiding in the rotation of the distributor structure and increasing the discharge capacity of the structure as a whole. From the point that the arm 17 cuts in, up until maximum head (for example 36 inches) and flow is reached, all of the arms continue to discharge the material, and with increasing flow and capacity. With this arrangement, by the time the maximum head and flow is reached, the flow capacity, per unit of time, is greatly increased over arrangements heretofore employed. The foregoing structure operates in three stages, and provides substantially the capacity advantages of a three arm structure wherein one arm would have the combined capacity of arms 15 and 16. Opposed arms 15 and 16 are preferably employed, however, for better and balanced distribution.

Vice versa, as the head and flow are decreased, the arm 17 will first cut out and next the arm 18. Flow will continue through the arms 15 and 16, and during all of this period, including that when the arms 17 and 18 cease to function with reactionary effect, the jets on the arms 15 and 16, due to their size and flow capacity, will continue to function with reactionary effect, even down to the minimum head and flow condition, to cause rotation of the distributor structure. In this way, the range of capacity has been increased without increasing the range in head. The capacity has been increased without disturbing the minimum flow and head condition required to effect rotation of the distributor device.

If merely uniform continuous flow with increased range in head (obtained, for example, by reduced minimum head) is desired, the foregoing variable height dam arrangement may be employed with equal capacity jets on all of the distributor arms.

In Fig. 4 I have shown another form of structure embodying my invention which lends itself to the attainment of the foregoing desirable features, and which differs from the previously-described form in that opposed distributor arms are always uniformly balanced against each other as is desired in certain installations. More particularly, this form of structure includes a central rotary drum 25, diametrically opposed distributor arms 26 (only one shown) having thereon jet devices 26ᵃ and 27ᵃ which are of a form similar to the previously-described jets on the arms 15, 16 of Fig. 1, except that the jets 26ᵃ are of increased capacity as compared to the jets 27ᵃ. In this structure, the opposed arms 28 and 29 are provided with overflow chambers or weirs 30 and 31, respectively, which are similar to the overflow chambers 21 and 23 except they are provided with dams 32 and 33 of equal height so that, when a predetermined head is reached in the drum 25, the material will overflow both of the dams 32 and 33 at the same time and the material will simultaneously flow into the arms 28 and 29. Also, in this form, the jets 34 and 35 on the arms 28 and 29 are preferably similar to each other in capacity and otherwise, but they are, preferably, of greater capacity than the jets 26ᵃ on the arm 26.

The jets 27ᵃ, which are located on the arm directly opposed to that carrying the jets 26ᵃ, are of sufficient capacity to produce an intended reactionary effect for the rotary motion of the distributor under minimum head or flow of the material to be distributed. The jets 26ᵃ are of increased capacity over the jets 27ᵃ for increased distributing capacity and they are, preferably, of such capacity that, if cut in simultaneously with the jets 27ᵃ under minimum head and flow conditions, the intended reactionary effect causing rotary motion of the distributor under minimum head and flow conditions would be disturbed. To avoid this condition, and to provide for the proper cut in the jets 26ᵃ with an increased capacity flow, the jets 26ᵃ are elevated above the jets 27ᵃ and their elevation is to such an extent that they do not cut in and discharge the liquid material until a certain increased head, for example 8″, has been established in the chamber section of the central rotary drum 25. It will be clear that, as soon as the desired increased head and flow are accomplished, the material will discharge through the elevated and increased capacity jets 26ᵃ with an additional reactionary effect.

As the flow or head of the material in the drum 25 (Fig. 4) builds up to a predetermined point, the material will overflow the dams 32 and 33 in the arms 28 and 29; and, as soon as effective heads, for example 8″, are built up in the weir chambers 30ᵃ and 31ᵃ, the material will discharge through the jets 34 and 35 with reactionary effect thereby aiding in the rotary motion of the distributor. As the head increases toward the maximum in the drum 25, such head is increased with respect to all of the jet devices on the arms 26, 28 and 29 so that the material is discharged with maximum capacity. In this way, like in the first-described form, the capacity of the jets, and the structure as a whole can be materially increased without increase in the normal maximum head and without disturbing the reactionary effect of the jets 27ᵃ under minimum head and flow conditions. Also, the weight in the opposed arms is equally distributed at all times so that the structure operates under balanced conditions and with minimum wear. This form of my invention also provides three stages of operation, with the third stage affording the capacity advantages of a single arm having the capacity of both arms 28 and 29. Opposed arms 28 and 29 are preferably provided, however, for purposes of better balance and distribution.

In Figs. 5, 6 and 7 I have illustrated additional forms of structure by which the advantages of my invention may be obtained. Briefly, the structure of Fig. 5 is similar to that previously described, except that no overflow chambers and dams are employed and it is adapted for so-called four-stage operation. Each arm has a plurality of jet devices, the jet devices 36 on the arm 37 being arranged on the longitudinal center line of such arm; the jet devices 38 on the arm 39, diametrically opposed to the arm 37, are of slightly greater capacity than the jet devices 36 and they are located slightly above the arm so as to discharge the liquid material only upon an increased head within the cylindrical drum 40; another one of the arms which corresponds to the arms 16 of the form shown in Fig. 1, is provided with jet devices 41 of slightly increased capacity which are located at a still greater height than the jet devices 38 so as to discharge only upon a still further increased head within the drum 40; and the arm 42 is provided with a plurality of jet devices 43 which are of increased capacity over jet devices 41 and which are located at a still greater discharge height than the jet devices 41 so that they will not discharge until the head is increased in the drum 40 materially above the head required to discharge through the jet devices 41 on the diametrically opposed arm. With this arrangement, as soon as predetermined head is reached in the drum 40, the material will discharge from the jet devices on arm 37 without any discharge from the other arms, although the other arms will be filled with the material so that they are all substantially uniformly balanced against each other. As soon as the head has increased to the discharge height of the jets 38 on the arm 39, the material will discharge through such jets, and the jets 41 and 43 will correspondingly discharge upon successive increases in the head within the drum 40. It will, therefore, be seen that the several arms may have successively increasing discharge capacity and that they are cut in successively under successive increases in head in such a way that the increased capacity of the arms does not affect the minimum flow and head conditions required for the structure. In other words, the structure will continue to operate properly with the desired reactionary effect afforded by the jets 36 on arm 37 at the minimum head and flow, and, while the range of capacity and continuous operation has been materially increased, this is accomplished without increase in range of head.

The structure shown in Fig. 6 is similar to that of Fig. 5 except that, instead of each arm having a plurality of similar jet devices, the jet devices of the several arms successively increase in capacity, and the corresponding jets successively cut into operation. Each arm is provided with a plurality of jet devices and each corresponding jet on each arm increases in capacity. The corresponding jets on each arm are so positioned that the jets on each arm will cut in in succession according to increase in head and desired capacity flow. More particularly, each distributor arm is provided with a jet device 44 of the same capacity and located on the longitudinal center line of the arm. Each arm is provided with a jet device 45 of slightly increased capacity located slightly above the arm so that it will not cut in until a predetermined head has been reached in the chamber of the drum 46. Outwardly beyond the jet devices 45 on each arm is another jet device 47 of further increased capacity which is located at a still greater height so that it will not cut in until a further increase in head takes place. The jet devices 48 on each arm are of still further increased capacity and are located at a still greater height for cut in at a higher head. The number of jet devices may be increased or diminished, as operating conditions may require, and, in this way, proper rotation of the distributor at minimum heads and flow is insured, and the capacity of the structure as a whole is materially increased without increase in maximum head.

The structure shown in Fig. 7 is similar to the forms as shown in Figs. 3 and 4. More particularly, the jets 51 are of sufficient capacity to insure the desired reactionary effect for rotation of the distributor under minimum flow and head conditions. The jets 49 on the arm corresponding to the arm 16 of Fig. 1 and diametrically opposed to the arm 50 are of greater capacity than the jets 51 on the arm 50; and the jets 49 are located at a higher level than the jets 51 (at a level substantially the same as the level of the jets 26ª in Fig. 4), so that they will not be cut in until there is a predetermined increase in the head of the material within the rotating central drum 52. In this way, as in Fig. 4, the desired reactionary effect for rotation of the distributor under minimum head and flow conditions is provided for. The other distributor arms 53 and 54 are provided with weirs 55 and 56, having, respectively, different height, dams 57 and 58 corresponding to the weirs 21 and 23 and the dams 22, 24 of the structure shown in Fig. 3. The jet devices 59 and 60 on the arms 53 and 54, respectively, are, preferably, of increased capacity over the jets 49, and the jets 60 are, preferably of increased capacity over the jets 59. This arrangement provides four successive stages of operation and capacity in that the material from the central drum 52 discharges successively through the jets 51, 49, 59 and 60. Each stage of operation requires a predetermined increase in the head of the material in the central rotary drum 52. In other words, the first two stages of operation are similar to those afforded by the jet devices 27ª and 26ª of the form of Fig. 4 and the third and fourth stages are similar to those afforded by the jet devices 19 on arms 18 and 17, respectively, of the Fig. 3 form.

It is believed that the operation and advantages of my invention will be readily understood from the foregoing description. I have referred in several instances to certain specific operating heads, but these heads have been mentioned only by way of example and to facilitate this description, and they may be varied to suit any particular condition of use. It is also to be understood that, while I have illustrated and described distributing structures with only four arms, the number of arms may be varied as desired. If the number of arms is increased, the increased capacity effect and the arrangement for cut in at increased heads may be carried forward with the additional arms in the same manner as pointed out in connection with the arms shown and described. If desired, the jet and jet cut in arrangements heretofore described may be employed in systems other than the reactionary impelled type, such, for example, as where the distributor is rotated by mechanical means. In such a use uniformity of distribution throughout the flow range would be insured.

It is to be further understood that while I have shown and described several forms of structure embodying my invention, changes of details and arrangements of parts may be resorted to without departing from the spirit and scope of my invention as defined by the claims that follow.

I claim:

1. In structure of the class described, a plurality of hollow rotary distributor arms, means for feeding simultaneously to all said arms the material to be delivered through said arms, a plurality of jet devices mounted on each of said arms, said jet devices being arranged in groups, means by which the material is discharged solely from one of said groups of jet devices at a predetermined minimum working head, and separate means for each of the other of said groups of jet devices by which each of said other groups is caused to discharge successively the material upon predetermined successive increases in the working head of the material, said jet devices being so constructed and arranged that each successively cut in group thereof is of increased capacity over the preceding cut in group.

2. In structure of the class described, a plurality of hollow rotary distributor arms, means for feeding the material to be delivered through said arms, a plurality of jet devices mounted on each of said arms, said jet devices being arranged in groups with the jet devices of one group having a predetermined capacity and the jet devices of the other groups increasing group by group in capacity, means by which the material is discharged from said one group of jet devices at a predetermined minimum working head, and separate means for each of said other groups of jet devices by which each of said other groups is caused to discharge successively according to increase in their capacity the material upon predetermined successive increases in the working head of the material.

3. In structure of the class described, rotary distributor structure comprising a central rotatable member having a chamber therein for receiving liquid material, means for feeding the material to said chamber, a plurality of hollow horizontally-disposed arms carried by said rotatable member and connected to said chamber for receiving material from the latter, jet devices on said arms by which the material is discharged from said arms, certain of said jet devices being of increased capacity over the remaining jet devices, and means whereby the material is fed from said increased capacity jet devices in the order of their increase and only upon successive predetermined increases in the head or level of the material in said chamber.

4. In structure of the class described, rotary distributor structure comprising a central rotatable member having a chamber therein, means for feeding liquid material to said chamber, a plurality of hollow, horizontally disposed arms carried by said member and radiating therefrom and into which the material flows from said chamber for distribution, jet devices on each arm for discharging the material therefrom, the jet devices on one arm being of a capacity adapted to discharge the material under the minimum working head with a reaction effect sufficient to cause rotary movement of said member and arms, the jets on each of the other of said arms progressively increasing in capacity, and means by which flow of material through the latter mentioned jets is permitted only successively according to the increase in the capacity of the jets thereon upon predetermined successive increases in the head or level of the material in said member chamber.

5. In structure of the class described, a rotatable member having provision for reception of the liquid material to be distributed, hollow arms extending from said rotatable member in a substantially horizontal direction and adapted to receive liquid from said rotatable member, jet devices carried by said arms and adapted to discharge the liquid material therefrom, and means providing in at least two of said arms dams preventing the flow of the liquid material into and through said arms except upon a predetermined increase in the head of the material in said rotatable member above the minimum workable head, the dam means in one of said arms being of greater height than that in the other arm, whereby the material is fed into the arms having the dams only at successive intervals upon successive and predetermined increases in the head of the material in said rotatable member, the jet devices on said arms having said dams being of increased capacity as compared to the jet devices on the other of said arms.

6. In structure of the class described, a rotatable member having provision for reception of the liquid material to be distributed, hollow arms extending from said rotatable member in a substantially horizontal direction and adapted to receive liquid from said rotatable member, jet devices carried by said arms and adapted to discharge the liquid material therefrom, and means providing in at least two of said arms dams preventing the flow of the liquid material into and through said arms except upon a predetermined increase in the head of the material in said rotatable member above the minimum workable head, the dam means in one of said arms being of greater height than that in the other arm, whereby the material is fed into the arms having the dams only at successive intervals upon successive and predetermined increases in the head of the material in said rotatable member, the jet devices on the arm having the lower of said dams being of increased capacity as compared to the jet devices on the other of said arms not having dams, and the jet devices on the arm having the higher of said dams being of increased capacity over the jet devices on the arm having the lower of said dams.

7. In a structure of the class described, rotary distributor structure comprising a central rotary member having a chamber therein, means for feeding the liquid material to said chamber, a plurality of hollow arms radiating from said member and connected to the chamber thereof for receiving the material therefrom, and means for discharging the material from said arms with reactionary effect requisite for causing rotary motion of the distributor structure which includes a plurality of jet devices of predetermined capacity located on one arm so as to discharge therefrom under minimum flow and head conditions, a plurality of jet devices of increased capacity on a second arm, which jet devices are located at a higher level than the jet devices on the first arm so as to discharge only upon an increase in head or level of the material in said chamber above the head level necessary for reactionary flow operation through the jets on the first arm, a plurality of jets of increased capacity located upon third and fourth arms, and dam means associated with said third and fourth arms for preventing flow of material to the jets thereon except upon a predetermined increase in the head of the material in said chamber.

8. In structure of the class described, a plurality of arms extending in substantially horizontal direction, means for feeding liquid material directly to said arms for distribution therefrom, all of said arms being connected to said feeding means and lying in a substantially common plane, whereby they all simultaneously receive substantially the same volume of liquid material from said feeding means, means for rotating said arms, jet devices mounted on said arms for discharging the liquid material therefrom, the jet devices on one of said arms being so located as to discharge the liquid material under a minimum head condition, and the jet devices on the other of said arms being of increased capacity and located at a higher level than said first jet devices so as to discharge the liquid material only upon a predetermined increase in the head of the discharging material above the minimum head.

9. In structure of the class described, rotary distributor structure comprising a central rotatable member having a chamber therein for receiving liquid material, means for feeding the material to said chamber, a plurality of hollow horizontally-disposed arms carried by said rotatable member and connected to said chamber for receiving material from the latter, jet devices on said arms for discharging the material therefrom, the jet devices on successive arms being of progressively increasing discharge capacity, and means operable under the control of the head or level of the material in said chamber by which the material is caused to discharge successively from said arms in increased amounts upon predetermined increases in the head or level of the material in said chamber.

10. In structure of the class described, rotary distributor structure comprising a central rotatable member having a chamber therein for receiving liquid material, means for feeding the material to said chamber, a plurality of hollow horizontally-disposed arms carried by said rotatable member and connected to said chamber for receiving material from the latter, said arms being arranged in opposed pairs, jet devices on said arms for discharging material therefrom, the jets on one pair of arms being of predetermined capacity and located on the longitudinal center line of said one pair of arms, the jets on one arm of the other pair of arms being of increased capacity and the jets on the other arm of said other pair being of still further increased capacity, and means for controlling the flow of the material to the arms having said increased capacity jets so that material discharges from said increased capacity jets only in the order of their capacity and upon increase in head or level of the material in said member chamber to a predetermined extent above minimum head.

11. In a structure of the class described, rotary distributor structure comprising a central rotary member having a chamber therein, means for feeding the liquid material to said chamber, a plurality of hollow arms radiating from and supported by said member and connected to said chamber, and means for discharging the material from said chamber through said arms, including jets of such character that the reaction thereof in discharging the material from said arms causes rotary motion of the distributor structure, the jet devices on the first of said arms being of predetermined discharge capacity and being located on the longitudinal center line of such arm, the jet devices on a second of said arms being of increased capacity and being located above the level of the jet on the first arm so as to discharge only upon a predetermined increase in head of the material within said chamber, the jets on a third arm being of still further increased capacity and being located at a still greater height so that they will discharge the material only upon an increased head in said chamber above the head required to discharge the material from the jets on the second arm, and the jets on a fourth arm being of still further increased capacity and being located at a still greater height so as to discharge material therefrom only upon a further increased head over that required to discharge the material from the jets of the third arm, the arrangement of the jets on all said arms being such that the material discharges with reactionary effect from one of the arms only at minimum head and from the other arms successively upon progressive increase in the head or level of the material within said chamber.

12. In structure of the class described, rotary distributor arms, means for feeding the liquid material to said arms for distribution thereby, jet devices carried by all of said arms, the jet devices on one of said arms being of sufficient capacity to discharge the material with reactionary control effect, with the jet devices on the other arms progressively increasing in capacity so that each arm has a different discharge capacity, and dam means located in at least two of the higher capacity arms, permitting the flow of the material to the jet devices of such arms only upon predetermined successive increases in the head or flow of the material fed thereto, the one of said dam means associated with the higher capacity arm being of greater height than the other of said dam means.

HUBERT BEDDOES.